F. P. MOORE.
BLOWER AND SUCTION CARPET AND RUG CLEANER.
APPLICATION FILED FEB. 17, 1920.
1,346,044.
Patented July 6, 1920.
5 SHEETS—SHEET 4.
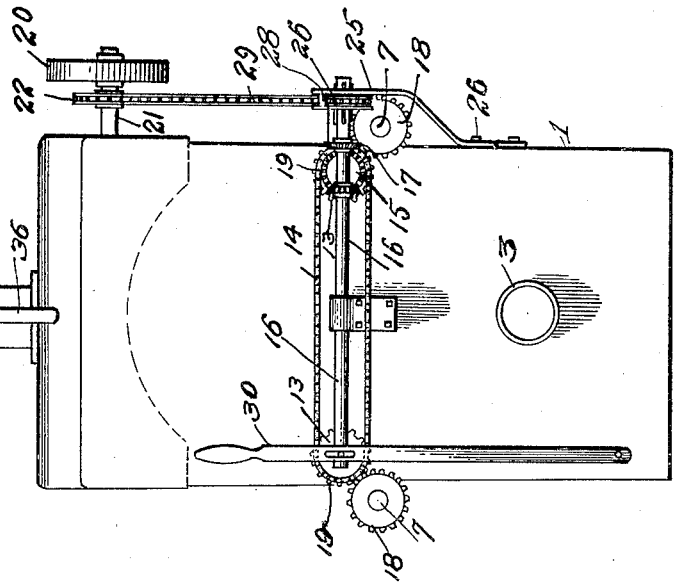
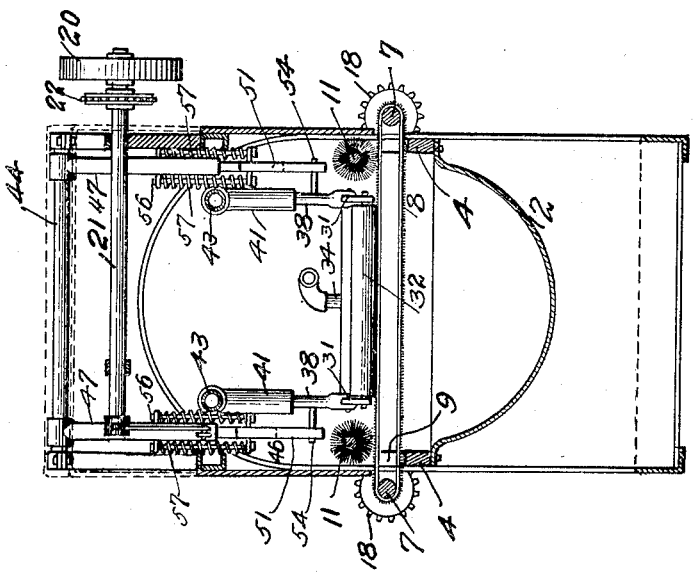
Inventor
Frank P. Moore.
By his Attorneys.

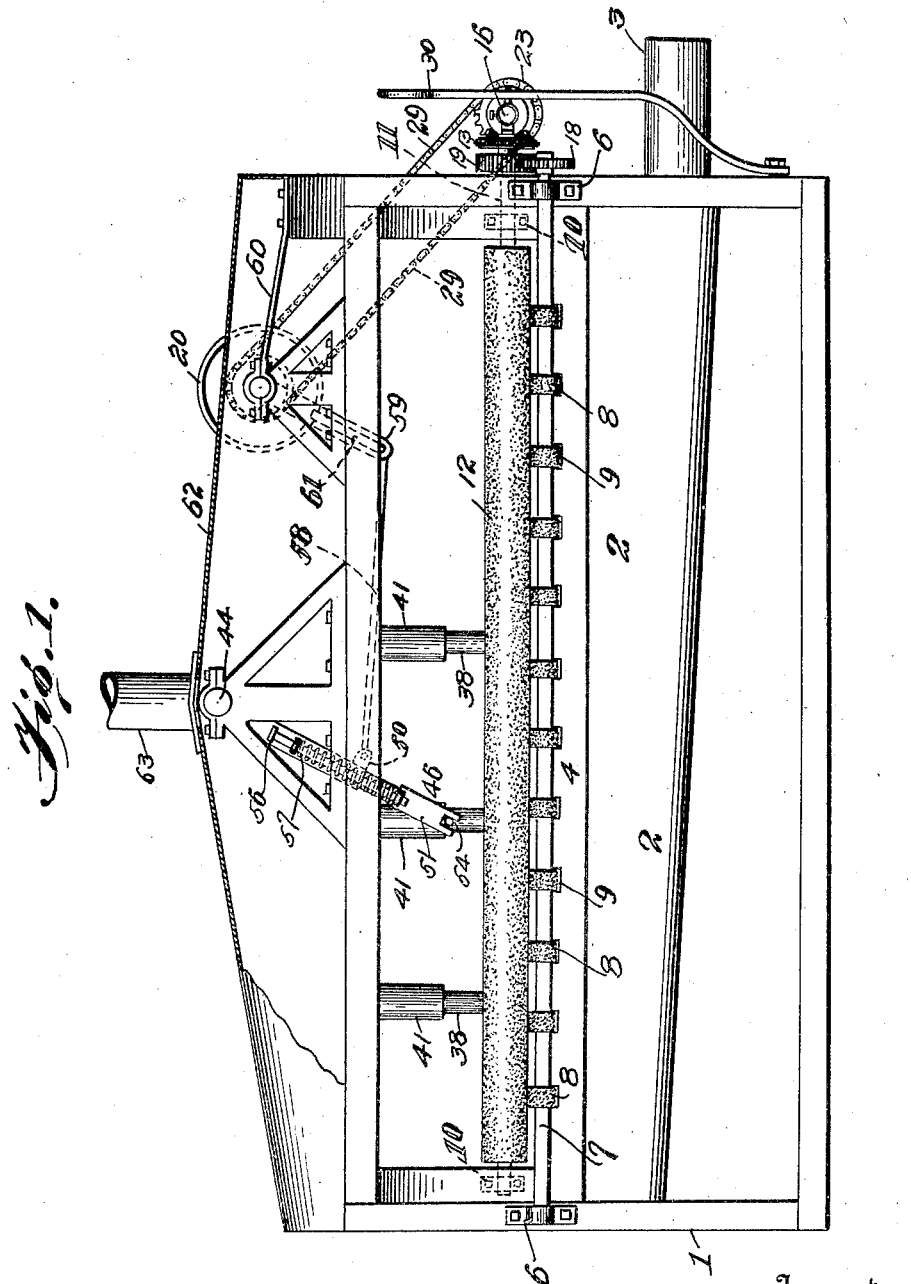

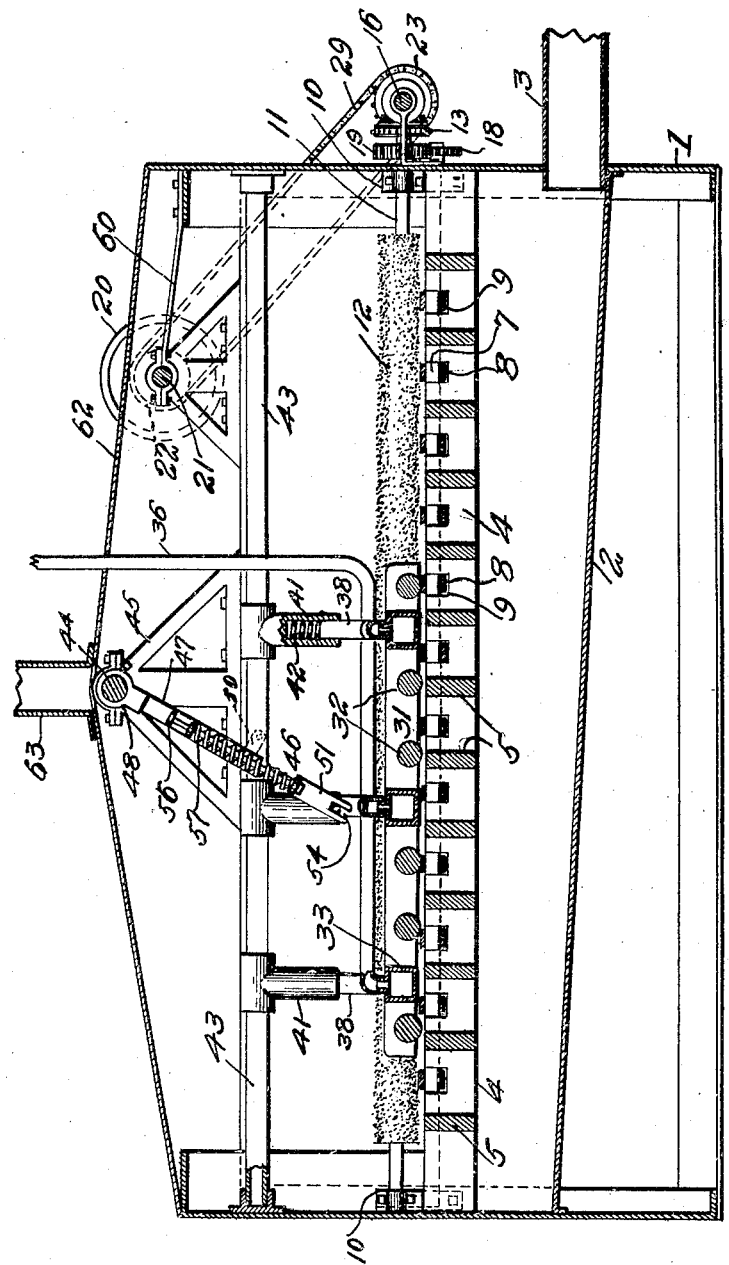

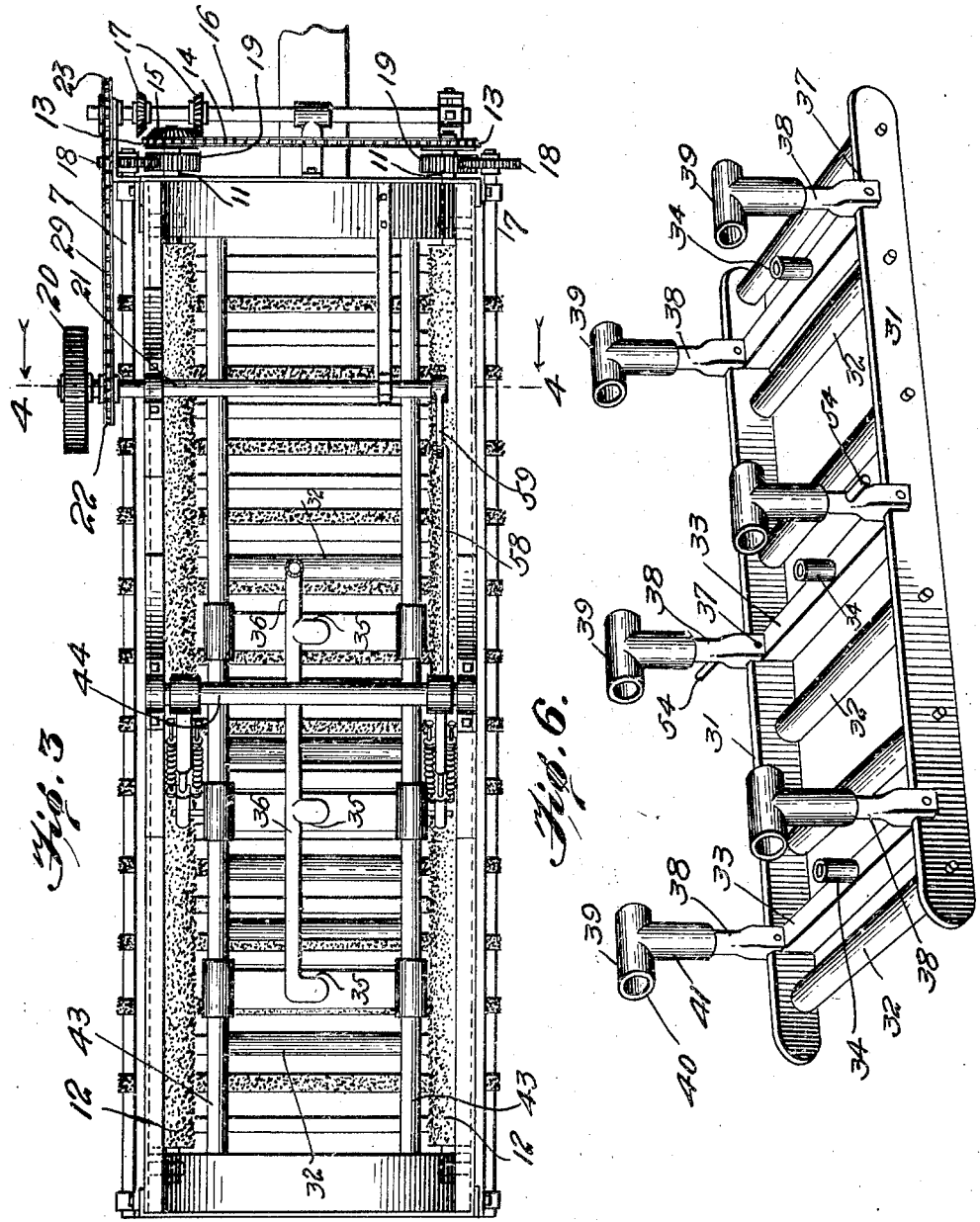

F. P. MOORE.
BLOWER AND SUCTION CARPET AND RUG CLEANER.
APPLICATION FILED FEB. 17, 1920.

1,346,044.

Patented July 6, 1920.
5 SHEETS—SHEET 5.

Inventor
Frank P. Moore.
By E. E. Vrooman & Co.,
his Attorneys

UNITED STATES PATENT OFFICE.

FRANK P. MOORE, OF ST. JOSEPH, MISSOURI.

BLOWER AND SUCTION CARPET AND RUG CLEANER.

1,346,044.   Specification of Letters Patent.   Patented July 6, 1920.

Application filed February 17, 1920. Serial No. 359,237.

*To all whom it may concern:*

Be it known that I, FRANK P. MOORE, a citizen of the United States, residing at St. Joseph, in the county of Buchanan and State of Missouri, have invented certain new and useful Improvements in Blower and Suction Carpet and Rug Cleaners, of which the following is a specification, reference being had therein to the accompanying drawings.

This invention relates to an apparatus for cleaning rugs, carpets and the like.

The object of the invention is the construction of a simple and efficient apparatus which will thoroughly clean a rug or carpet by means of a blower device, together with suction means and brushes.

With this and other objects in view, my apparatus comprises certain other novel constructions, combinations and arrangements of parts as will be hereinafter fully described, illustrated in the accompanying drawings, and more particularly pointed out in the appended claims.

In the drawings:

Figure 1 is a view in side elevation, showing the hood or cover partly in section, of an apparatus constructed in accordance with the present invention.

Fig. 2 is a longitudinal sectional view of the apparatus shown in Fig. 1.

Fig. 3 is a top plan view of the apparatus, the cover being removed.

Fig. 4 is a sectional view taken on line 4—4, Fig. 3, looking in the direction of the arrows.

Fig. 5 is an end view of the front or gear-carrying end of the apparatus.

Fig. 6 is a perspective view of the blower carriage.

Fig. 7 is a front view of one of the connecting devices, while

Fig. 9 is a fragmentary perspective view of the apparatus, showing the gear housing, while

Figure 7:
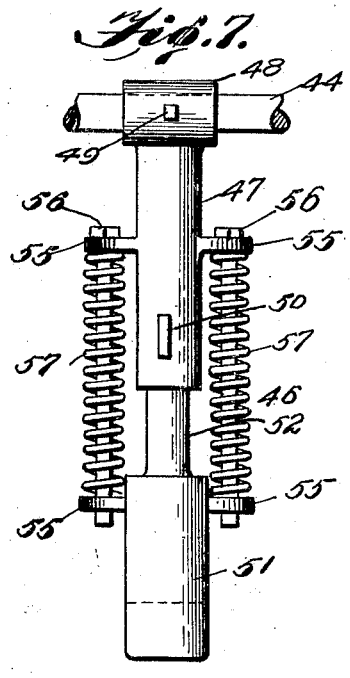

Referring to the drawings by numerals:

1 designates a frame in the lower portion of which is an inclined suction pan 2, extending the entire length of the frame, and communicating with the lower end of pan 2 is a horizontally arranged suction pipe 3. Above the pan 2 is a horizontal table comprising side pieces 4, and transverse slats 5.

Journaled in brackets 6 on the sides of the frame 1, contiguous to the side pieces 4 are belt rollers 7 carrying endless belts 8; these belts 8 travel through notches 9, formed in the side pieces 4, and the belts 8 assist in passing the rug or carpet transversely through the machine. The side pieces 4, slats 5 and the transversely arranged belts 8 constitute an efficient table for supporting the article to be cleaned.

Within the frame 1 are brackets 10, within which shafts 11 are journaled; each shaft 11 is provided with a brush 12 that extends the entire length of the slatted table (Fig. 2), and as there are a pair of brushes 12, one at each side of the frame (Fig. 3), the rug or carpet is thoroughly brushed irrespective as to which side it is inserted into the apparatus, and by passing the rug or carpet back and forth through the apparatus, from side to side, it will be thoroughly brushed by the pair of rotary brushes 12. To rotate these brushes, the shafts 11 are extended beyond the front end of the frame and each is provided with sprocket wheels 13 that are connected by a sprocket chain 14. One of sprocket wheels 13 constitute a part of a beveled gear 15, and through the medium of the slidable clutch shaft 16, carrying beveled gears 17, beveled gear 15 can be engaged for rotating the same in different directions, thereby reversing the movement of the rotary brushes; and, as the belt rollers 7 are provided with gears 18 meshing with gears 19, fixed to the shafts 11, the belts 8 will be caused to travel in different directions by shifting the clutch shaft 16.

Figure 9:
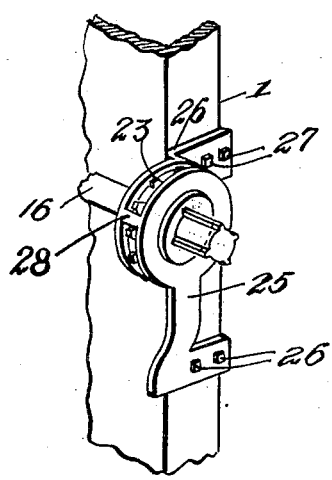
Figure 10:
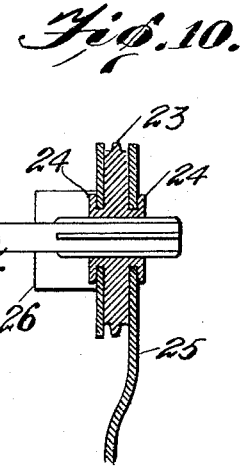
Fig. 10 is a sectional view of the same.

The belt wheel 20 is fastened to the outer end of driving shaft 21 and a gear 22 is secured to shaft 21. A gear 23 is mounted upon the splined end of clutch shaft 16 (Figs. 9 and 10), and this gear is provided with flanged ends 24. A primary bracket 25 is secured, at 26, to the frame 1, and is positioned against the gear 23 within one of its flanged ends. An auxiliary bracket 26 is secured at 27 to the frame 1, and like bracket 25, this bracket is also secured at its outer end between one side of the gear 23 and one of its flanged ends 24; the brackets 25 and 26 are connected by a strap 28 (Fig. 9) producing a very efficient housing for the gear 23; in other words, I have produced a housing, in which a gear is mounted, which housing comprises a pair of brackets, a strap or integral part connecting the brackets, and within the brackets is mounted a gear. Mounted upon the gears 22 and 23 is a sprocket chain 29 and this sprocket chain drives the clutch shaft 16 when the driving shaft 21 is rotated. A shifting lever 30 (Fig. 5) is pivotally secured at its lower end upon the frame, and is used to shift the clutch shaft 16.

A blower carriage is provided for traveling over the table and blowing upon the article to be cleaned. This blower carriage comprises (Fig. 6) side pieces or plates 31 upon which, near their lower edges, are journaled the ends of rollers 32. I preferably secure a plurality of nozzles 33 upon the plates 31, and extending from the top of each nozzle is a pipe connection 34, to which connections are attached the branching ends 35 of the air supplying pipe 31 (Fig. 3). Air is supplied, through pipe 36, to the nozzles 33, and is delivered against the article supported by the slatted table and the transversely positioned belts thereon. On each side plate, I secure the lower bifurcated ends 37 of the posts 38. Vertically movable upon the posts 38 are sleeves 39; each sleeve comprises a hollow horizontal portion 40 and a depending hollow portion 41; within the depending portion 41 of each sleeve is a coil spring 42 (Fig. 2) that presses down upon the upper end of the posts 38 so that all of the posts are spring pressed for holding the blower carriage tightly against the article being cleaned. The sleeves 39 are slidably mounted upon tie rods 43 by means of the hollow horizontal portions 40 whereby the carriage is free to slide back and forth on rods 43.

Figure 8:
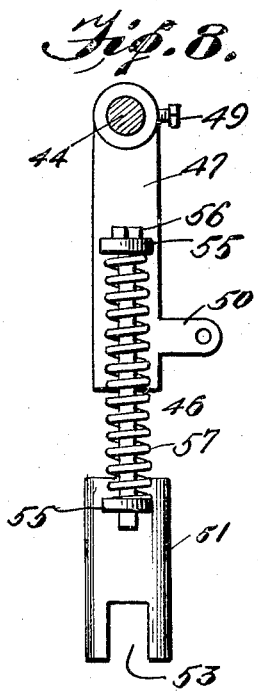
Fig. 8 is a side view of the same.

The suspending shaft 44 is journaled upon an auxiliary frame 45 (Fig. 2) carried by the main frame, and this shaft 44 supports a pair of connecting devices 46 (Figs. 7 and 8). These connecting devices are similarly constructed and it will only be necessary to describe one. Each connecting device comprises a casing 47 that is provided with a sleeve 48, which sleeve surrounds shaft 44. The sleeve 48 is fastened by screw 49 to the shaft 44 so that rotary movement of the shaft will cause the connecting member to swing. The hollow casing 47 is provided with an apertured link-engaging lug 50, near its lower end.

The auxiliary casing 51 is provided at its upper end with a piston-like extension 52 that slides in the hollow primary casing 47; this casing 51 is bifurcated at 53 so as to straddle the outwardly projecting pins 54 on the central posts of the blower carriage. Integral with opposite sides of the primary and auxiliary casings 47 and 51 are lugs 55, upon which lugs are positioned bolts 56, and mounted upon the bolts between the lugs are coil springs 57, which coil springs exert a downward pressure upon the auxiliary casing 51 for keeping the bifurcated end in engagement with the pin 54. A link 58 is connected at its inner end with lug 50, and its outer end is connected to the arm 59 fastened to the inner end of the driving shaft 21. The inner end of the driving shaft 21 is supported by a bracket 60. The arm 59 is slotted at 61 so that the link 58, at its outer end, will have a relatively short movement so that the link 58 will slide back and forth in the arm 59 as the arm rotates, causing the connecting devices 46 to move blower carriage back and forth, the length of the slatted table, permitting the nozzles to blow upon the entire length of the table, thereby blowing the dirt or dust out of the rug or carpet upon the table, the blowing action being assisted by the rotary side brushes 12. Suction being created through pipe 3 will cause the dirt and dust in the pan 2 to be drawn from the apparatus, and by means of a hood or cover 62 being placed over the top of the machine, and this cover provided with a suction pipe 63, the dust in the upper part of the apparatus will be sucked out of the same, thereby cleaning or clearing the machine of all dust which will further assist in efficiently cleaning the rug or carpet.

As the blower carriage is drawn over toward the middle of the machine, the auxiliary casing 51 of the connecting devices 46 will move up toward the primary casings 47, compressing springs 57, and as swinging movement is continued by the connecting devices, the blower carriage will be further drawn over the table, and upon the blower carriage approaching one end of the table the springs 57 will be depressed or somewhat released, by reason of the bifurcated ends 53 being at all times in operative engagement with the pins 54. It is to be noted that the side plate 31 with its attendant parts constitutes the body of the blower carriage; the body including rollers and nozzles and rising above the body are the posts 38.

While I have described the preferred embodiments of my invention and have illustrated the same in the accompanying drawings, in the extensive manufacture of the apparatus, certain minor changes or alterations may be found necessary by a person skilled in the art to which this invention relates and, therefore, I reserve the right to make such changes or alterations as shall fairly fall within the scope of the appended claims.

What I claim is:

1. In an apparatus of the class described, the combination with a frame, of a table carried by said frame, a blower carriage traveling upon said table, said carriage comprising a body provided with rollers and with a nozzle, means for supplying air to said nozzle, posts extending from the body, connecting devices connected to said posts, and means for moving the connecting devices for causing travel of the blower carriage over the table.

2. In an apparatus of the class described, the combination with a frame, of a table carried by said frame, a blower carriage traveling upon said table, said carriage comprising plates, rollers journaled at their ends upon said plates near their lower edges, nozzles secured at their ends to said plates, said nozzles adapted to blow upon said table, each nozzle provided with a pipe connection, a pipe connected to each pipe connection of the nozzles, posts provided with lower bifurcated ends connected to the side plates, sleeves provided with hollow horizontal portions and with depending hollow portions, the depending hollow portions positioned upon the posts, yieldable means in the depending hollow portions bearing upon the upper ends of the posts, tie rods upon the frame, said horizontal portions of the sleeves surrounding the tie rods, and driving means connected to some of the posts for moving the carriage over the table.

3. In an apparatus of the class described, the combination with a frame, of a table carried by said frame, blower means traveling over said table, connecting devices connected to said blower means for causing movement thereof, each connecting device comprising a primary casing, an auxiliary casing slidably mounted upon said primary casing, a spring for normally exerting downward or outward pressure upon the auxiliary casing, and means for causing swinging movement of the connecting devices.

4. In an apparatus of the class described, the combination with a frame, of a table carried by said frame, blower means adapted to travel back and forth over said table, connecting devices secured to said blower means, each connecting device comprising spring-pressed slidable parts for causing said connecting devices to engage at all times the blower means, and means for moving or swinging the connecting devices for causing the blower means to travel over the table.

5. In an apparatus of the class described, the combination with a frame, of a table carried by said frame, blower means carried by said table and adapted to travel from end to end, connecting devices assembled with the blower means, said connecting devices each comprising a primary casing having a sleeve at its upper end, an auxiliary casing provided with piston-like extensions positioned within the primary casing, said primary and auxiliary casings provided with apertured lugs, bolts within the apertures of said lugs, springs upon said bolts and between the lugs and normally exerting a downward pressure upon the auxiliary casing for positively holding the auxiliary casing in engagement with the blower means, and means for operating or swinging the connecting devices for imparting movement to the blower means.

6. In an apparatus of the class described, the combination with a frame, of a table carried by said frame, sleeves supported upon said frame, nozzle-carrying means slidably mounted within said sleeves, and means yieldably connected to said sleeves for moving the sleeves over the table and thereby moving the nozzle for permitting the nozzle to blow upon the table at different points thereon.

7. In an apparatus of the class described, the combination with a frame, a table carried by said frame, of a blower carriage above said table, said blower carriage including a body provided with a post and a sleeve mounted upon said post, a spring in said sleeve and bearing against the upper end of the post, a tie rod carried by the frame and extending through a portion of the sleeve, and means for drawing upon the post and sleeve for causing the same to slide back and forth upon the tie rod and thereby move the body of the blower carriage over the upper surface of the table and over any work that may be thereon.

8. In an apparatus of the class described, the combination with a frame, a table upon said frame, of a blower carriage above said table comprising a body including a nozzle and with upstanding posts, sleeves surrounding said posts, means in the sleeves for exerting downward pressure upon the posts, means slidably mounting the sleeves upon the frame, and means for imparting movement to the blower carriage and thereby causing the sleeves to travel upon the connecting means.

9. In an apparatus of the class described, the combination with a frame, a table carried by said frame, of a blower carriage above said table, said carriage comprising a body with upstanding posts, pins extending from the sides of said posts, adjustable spring-pressed connecting devices engaging the pins, and means for imparting movement to the connecting devices for driving the blower carriage over the table.

In testimony whereof I hereunto affix my signature.

FRANK P. MOORE.